(12) United States Patent
Chen

(10) Patent No.: US 9,946,426 B2
(45) Date of Patent: Apr. 17, 2018

(54) METHOD FOR FORMING METAL MESH PATTERN AND TOUCH PANEL

(71) Applicants: Interface Optoelectronics Corporation, Shenzhen (CN); General Interface Solution Limited, Miaoli County (TW)

(72) Inventor: Giing-Lii Chen, New Taipei (TW)

(73) Assignees: INTERFACE OPTOELECTRONICS CORPORATION, Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 146 days.

(21) Appl. No.: 14/555,726

(22) Filed: Nov. 28, 2014

(65) Prior Publication Data

US 2016/0149572 A1   May 26, 2016

(30) Foreign Application Priority Data

Nov. 25, 2014  (CN) .......................... 2014 1 0689869

(51) Int. Cl.
  *G06F 3/047*  (2006.01)
  *G06F 3/044*  (2006.01)

(52) U.S. Cl.
  CPC ............. *G06F 3/047* (2013.01); *G06F 3/044* (2013.01); *G06F 2203/04112* (2013.01)

(58) Field of Classification Search
  None
  See application file for complete search history.

(56) References Cited

U.S. PATENT DOCUMENTS

| | | | | |
|---|---|---|---|---|
| 7,875,814 B2* | 1/2011 | Chen | ...................... | G06F 3/046 178/18.01 |
| 8,943,903 B1* | 2/2015 | Guard | .................. | G06F 3/0416 345/173 |
| 8,963,561 B2* | 2/2015 | Yilmaz | .................. | G06F 3/044 324/649 |
| 9,141,248 B2* | 9/2015 | Kim | ....................... | G06F 3/045 |
| 2009/0315854 A1* | 12/2009 | Matsuo | ................. | G06F 3/0412 345/174 |
| 2010/0045614 A1* | 2/2010 | Gray | ....................... | G06F 3/044 345/173 |
| 2010/0066701 A1* | 3/2010 | Ningrat | .................. | G06F 3/044 345/174 |

(Continued)

OTHER PUBLICATIONS

Prof. Roberto Tamassia, Introduction to Voronoi, Mar. 22, 1993, cs.brown.edu, Sem.II, 1992-1993.*

*Primary Examiner* — Grant Sitta
(74) *Attorney, Agent, or Firm* — CKC & Partners Co., Ltd.

(57) ABSTRACT

A method for forming a metal mesh pattern is provided. The method includes the operations below. First, at least one pitch of each of mesh base units of a mesh base is determined, and thereby the mesh base is formed. Then, a seed region is set in each of the mesh base units of the mesh base, in which a ratio of an area of each of the seed regions to an area of each of the mesh base units is a constant. Then, a plurality of seeds are generated by randomly selecting a point in each of the seed regions. Finally, the metal mesh pattern is formed, in which the metal mesh pattern is a set of perpendicular bisectors of lines connecting the seeds and their adjacent neighboring seeds.

11 Claims, 8 Drawing Sheets

(56) References Cited

U.S. PATENT DOCUMENTS

| | | | |
|---|---|---|---|
| 2010/0079387 A1* | 4/2010 | Rosenblatt | G06F 1/1626 345/173 |
| 2010/0328228 A1* | 12/2010 | Elias | G06F 3/044 345/173 |
| 2011/0102361 A1* | 5/2011 | Philipp | G06F 3/044 345/174 |
| 2011/0291966 A1* | 12/2011 | Takao | G06F 3/044 345/173 |
| 2012/0031647 A1* | 2/2012 | Hwang | C23F 1/02 174/250 |
| 2012/0127122 A1* | 5/2012 | Lim | G06F 3/0416 345/174 |
| 2013/0028503 A1* | 1/2013 | Wakui | H05K 9/0086 382/141 |
| 2014/0118641 A1* | 5/2014 | Ryu | G06F 1/1692 349/12 |
| 2014/0168092 A1* | 6/2014 | Yilmaz | G06F 3/044 345/173 |
| 2014/0218325 A1* | 8/2014 | Iwami | B32B 7/02 345/173 |
| 2014/0218642 A1* | 8/2014 | Iwami | G06F 3/044 349/12 |
| 2015/0070294 A1* | 3/2015 | Guard | G06F 3/044 345/174 |
| 2015/0234509 A1* | 8/2015 | Guard | G06F 3/0412 345/174 |
| 2015/0370375 A1* | 12/2015 | Hayashi | G06F 3/044 345/174 |
| 2016/0081184 A1* | 3/2016 | Katagiri | H01L 51/0021 174/268 |
| 2016/0283004 A1* | 9/2016 | Chen | G06F 3/041 |

* cited by examiner

METHOD FOR FORMING METAL MESH PATTERN AND TOUCH PANEL

RELATED APPLICATIONS

This application claims priority to Chinese Application Serial Number 201410689869.1, filed Nov. 25, 2014, which is herein incorporated by reference.

BACKGROUND

Technical Field

The present disclosure relates to a method for forming a metal mesh pattern and a touch panel.

Description of Related Art

Metal mesh technology is a touch technology, in which thin metal wires (invisible for naked-eyes) are disposed in the grid pattern and detect the position of the touch object. Compared with the indium tin oxide electrode technology, mesh metal technology has advantages of low impedance, low manufacturing cost, good transparency, and high flexibility. Metal mesh technology is suitable for applications such as laptop computers and other electronic devices with large-size displays.

Though metal wires used in metal mesh technology are thin, the metal wires remain opaque. Therefore, moiré generated by the superimposition of the special pattern showed by the display panel and the metal mesh may be seen. In order to avoid generating moiré, the metal mesh pattern is usually specially designed. Common metal mesh pattern is square-shaped, diamond-shaped or hexagonal. Though diamond-shaped or hexagonal metal mesh does not generate moiré in the monochromatic picture with the maximum brightness, moiré may still be generated when the display panel shows a special pattern (for example, when the display panel shows a monochromatic picture in a specific grayscale, the pattern showed by the sub-pixels of the display panel is similar to the pattern of a checkerboard), leading to a poor display performance.

SUMMARY

This disclosure provides a method for forming a metal mesh pattern and a touch panel to avoid generating moiré on a display panel.

In one aspect of the disclosure, a method for forming a metal mesh pattern is provided. The method includes the operations below. First, at least one pitch of each of a plurality of mesh base units of a mesh base is determined, and thereby the mesh base is formed. Then, a seed region is set in each of the mesh base units of the mesh base, in which a ratio of an area of each of the seed regions to an area of each of the mesh base units is a constant. Then, a plurality of seeds are generated by randomly selecting a point in each of the seed regions. Finally, the metal mesh pattern is formed, in which the metal mesh pattern is a set of perpendicular bisectors of lines connecting the seeds and their adjacent seeds.

In one or more embodiments, mesh base units are rectangles.

In one or more embodiments, each of the mesh base units is aligned with its adjacent mesh base units.

In one or more embodiments, the mesh base units are staggered with the adjacent mesh base units.

In one or more embodiments, the mesh base is inclined relative to a corresponding display panel.

In one or more embodiments, an inclined angle between the mesh base and the display panel is substantially 30 degrees.

In one or more embodiments, the ratio of the area of each of the seed regions to the area of each of the mesh base units is from 25% to 65%.

In one or more embodiments, each of the seed regions and each of the mesh base units are concentric.

In one or more embodiments, a ratio of a length of the pitch of each of the mesh base units to a side length of a sub-pixel of a corresponding display panel is from 1.05 to 1.2.

In one or more embodiments, a ratio of a length of the pitch of each of the mesh base units to a side length of a sub-pixel of a corresponding display panel is from 1.5 to 1.7.

In another aspect of the disclosure, a touch panel is provided. The touch panel includes a substrate and a first metal mesh. The first metal mesh is disposed on one side of the substrate, in which the first metal mesh has a first metal mesh pattern formed by the aforementioned method.

In one or more embodiments, the first metal mesh includes a plurality of first mesh units, and the shapes of the first mesh units are irregular hexagons.

In one or more embodiments, the touch panel further includes a second metal mesh disposed on the other side of the substrate, in which the second metal mesh has a second metal mesh pattern formed by the aforementioned method. The first metal mesh includes a plurality of first mesh units. The second metal mesh includes a plurality of second mesh units. Orthographic projections of the first mesh units onto the substrate are staggered with orthographic projections of the second mesh units onto the substrate.

By the aforementioned method, the shapes of mesh units of the metal mesh pattern are different, i.e., the shapes are random. Therefore, moiré may not be generated by the superimposition of the metal mesh in the metal mesh pattern and the pattern showed by the display panel, such that the display device has a better display performance.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
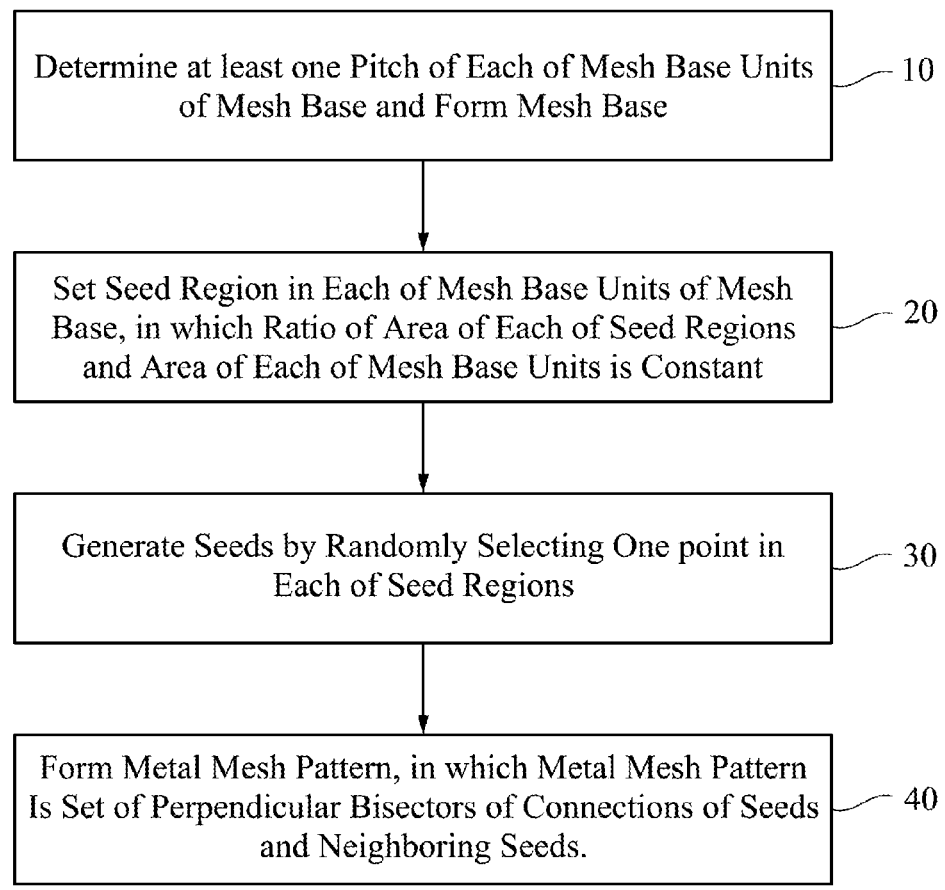
FIG. 1 is a flow chart of a method for forming a metal mesh pattern according to one embodiment of this invention.
Figure 2A:
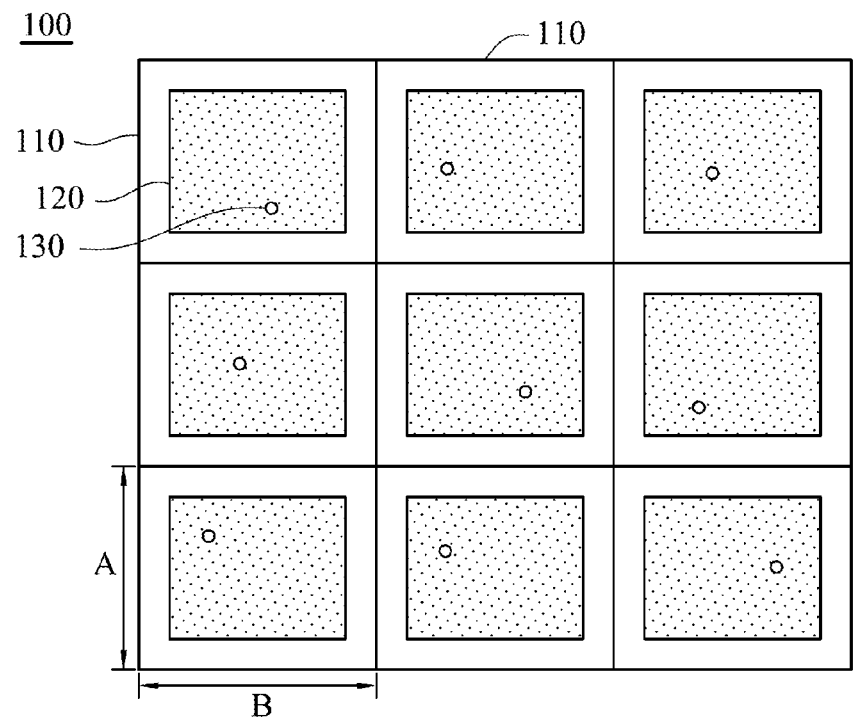
FIG. 2A is a schematic view of a mesh base, seed regions, and seeds according to one embodiment of this invention.
Figure 2B:
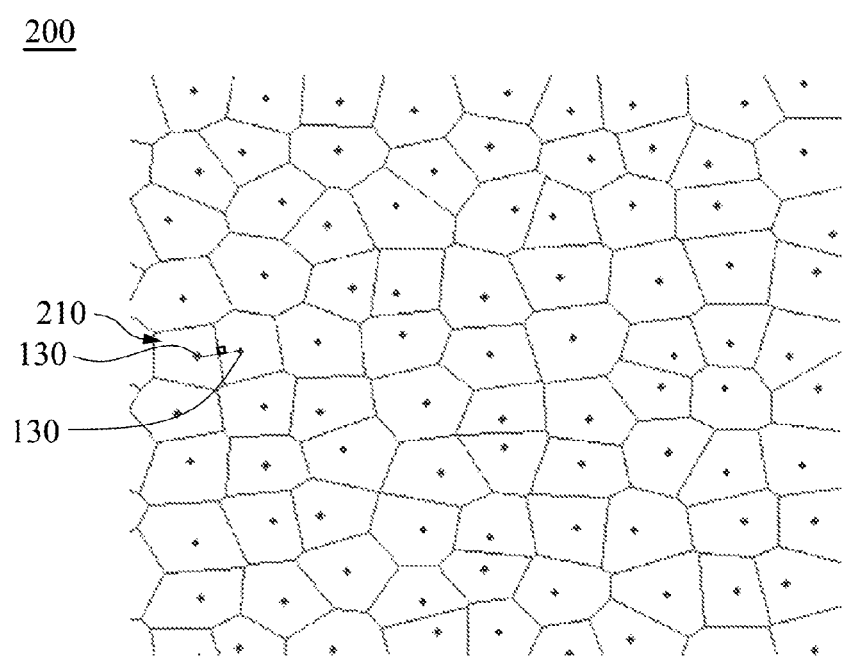
FIG. 2B is a schematic view of the metal mesh pattern formed by the seeds of FIG. 2A.

FIG. 1 is a flow chart of a method for forming a metal mesh pattern 200 according to one embodiment of this invention. FIG. 2A is a schematic view of a mesh base 100, seed regions 120, and seeds 130 according to one embodiment of this invention. FIG. 2B is a schematic view of the metal mesh pattern 200 formed by the seeds 130 of FIG. 2A. A method for forming a metal mesh pattern 200 is provided. The metal mesh pattern 200 is applied to metal mesh touch technology.

As shown in FIG. 1, FIG. 2A, and FIG. 2B, operation 10 is determining at least one pitch of each of a plurality of mesh base units 110 of a mesh base 100, such as a width A and a length B (the width A and the length B may be the same or different according to the pixel design of the corresponding display panel) and thereby forming the mesh base 100. Operation 20 is setting a seed region 120 in each of the mesh base units 110 of the mesh base 100, in which a ratio of an area of each of the seed regions 120 to an area of each of the mesh base units 110 is a constant. Operation 30 is generating a plurality of seeds 130 by randomly selecting a point in each of the seed regions 120. Operation 40 is forming the metal mesh pattern 200, in which the metal mesh pattern 200 is a set of perpendicular bisectors of lines connecting the seeds 130 and their adjacent seeds 130.

As shown in FIG. 2B, by the aforementioned method, the shapes of mesh units 210 of the metal mesh pattern 200 are different, i.e., the shapes are random. Therefore, moiré may not be generated by the superimposition of a metal mesh in the metal mesh pattern 200 and the pattern showed by the display panel (for example, a pattern similar to the pattern of a checkerboard showed by the sub-pixels of the display panel when the display panel shows a monochromatic picture in a specific grayscale), such that the display device has a better display performance.

Because moiré is not easy to be generated by the superimposition of the metal mesh and the pattern showed by the display panel, the linewidth of the metal mesh can be greater without influencing the display performance. Therefore, the process for manufacturing the metal mesh becomes easier, and the manufacturing cost is reduced.

Additionally, by the aforementioned method, the areas of the mesh units are approximately the same, so the metal wires of the metal mesh in the metal mesh pattern 200 are substantially evenly distributed and suitable for touch detection.

As shown in FIG. 1 and FIG. 2A, in operation 10, specifically, the mesh base units 110 are rectangles. Embodiments of this disclosure are not limited thereto. People having ordinary skill in the art can make proper modifications to the mesh base units 110 depending on the actual application.

Each of the mesh base units 110 is aligned with its adjacent mesh base units 110. Embodiments of this disclosure are not limited thereto. In other embodiments, the mesh base units 110 may have other distribution pattern (For example, the distribution pattern in FIG. 3A).

In operation 20, specifically, the seed regions 120 are rectangles, and each of the seed regions 120 and each of the mesh base units 110 are concentric. Embodiments of this disclosure are not limited thereto. People having ordinary skill in the art can make proper modifications to the mesh base units 110 and the seed regions 120 depending on the actual application.

In operation 30, specifically, the probability of selecting each point in each of the seed region 120 is substantially the same. In other words, the probability of disposing the seed 130 in each point in each of seed regions 120 is substantially the same.

As shown in FIG. 1 and FIG. 2B, in operation 40, specifically, the distance between any point in each of the mesh units 210 and the seed 130 in the same mesh unit is smaller than the distance between any point in each of the mesh units 210 and the seed 130 in any different mesh unit 210. In other words, any point in each of mesh units 210 is closest to the seed 130 in the same mesh unit 210 among all seeds 130. This kind of pattern is so called voronoi diagram.

Figure 3A:
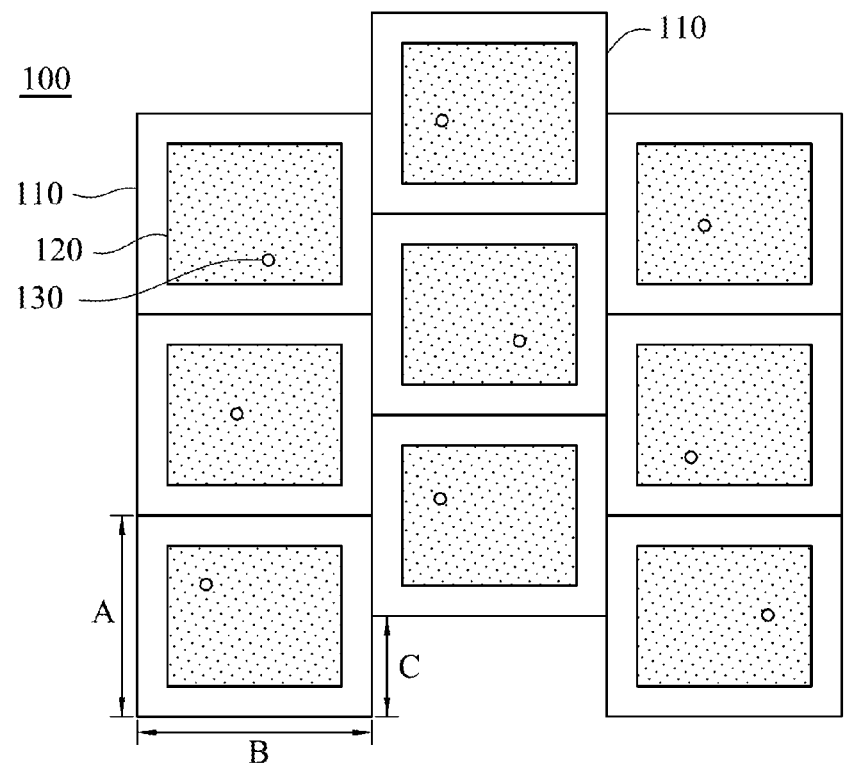
FIG. 3A is a schematic view of the mesh base, the seed regions, and the seeds according to another embodiment of this invention.
Figure 3B:
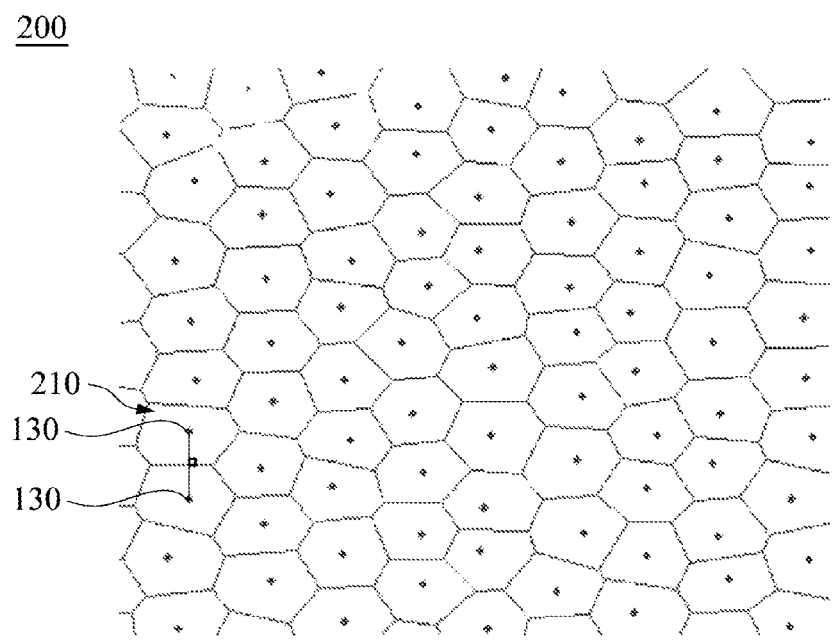
FIG. 3B is a schematic view of the metal mesh pattern formed by the seeds of FIG. 3A.

FIG. 3A is a schematic view of the mesh base 100, the seed regions 120, and the seeds 130 according to another embodiment of this invention. FIG. 3B is a schematic view of the metal mesh pattern 200 formed by the seeds 130 of FIG. 3A. As shown in FIG. 3A and FIG. 3B, this embodiment uses another distribution pattern. Specifically, the mesh base units 110 are staggered with the adjacent mesh base units 110, and there is a column difference C between each column of the mesh base units 110. For example, in this embodiment, the column difference C is a vertical distance between bottoms of the mesh base unit 110 and the neighboring mesh base unit 110 in the neighboring column. The column difference C is less than the width A, and the actual relation of the column difference C and the width A is adjusted according to the pixel design of the corresponding display panel. By using this distribution pattern, the shapes of the generated mesh units 210 of the metal mesh pattern 200 are irregular hexagons. Specifically, the shapes of the mesh units 210 are similar to a honeycomb. Compared with the mesh units 210 of FIG. 2B, the mesh units 210 of the embodiment are distributed more evenly.

Figure 4A:
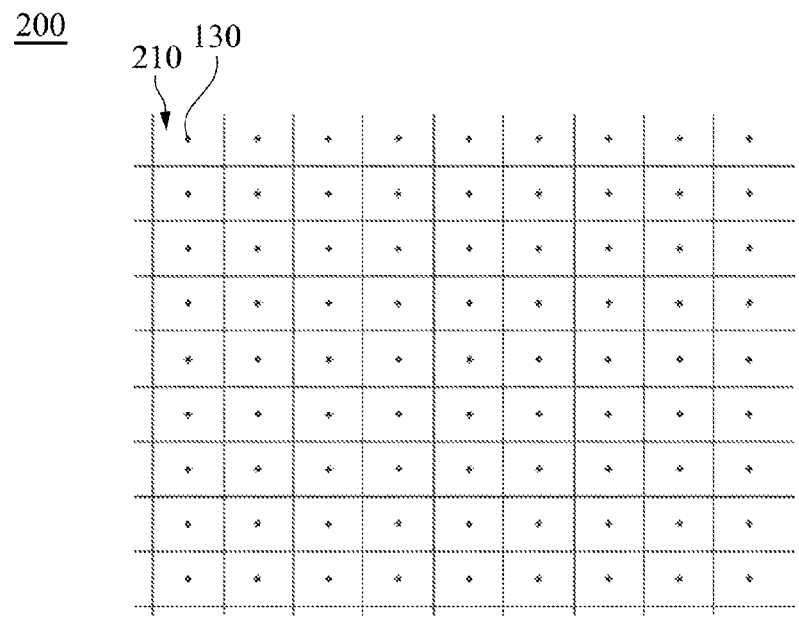
FIG. 4A is a schematic view of the metal mesh pattern when the ratio of the area of each of the seed regions to the area of each of mesh base units is 0 according to another embodiment of this invention.
Figure 4B:
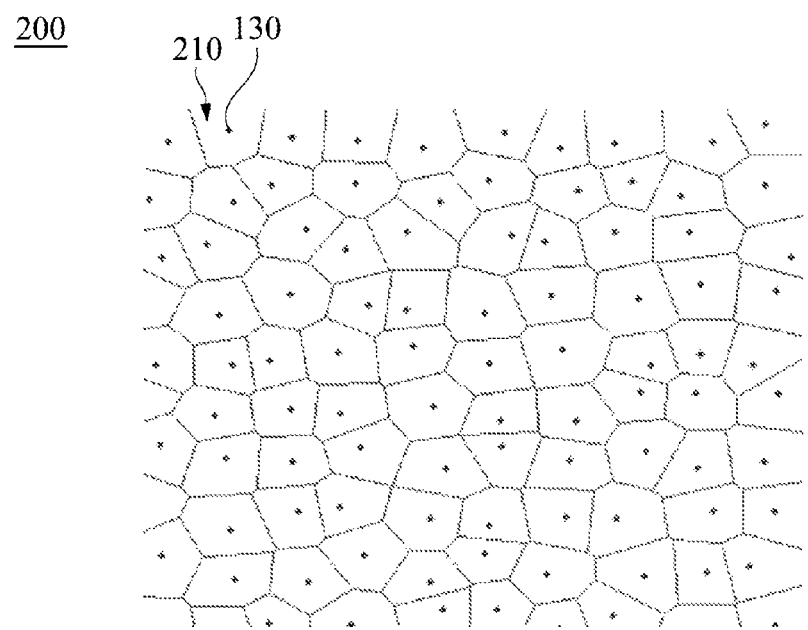
FIG. 4B is a schematic view of the metal mesh pattern when the ratio of the area of each of the seed regions to the area of each of the mesh base units is 25% according to another embodiment of this invention.
Figure 4C:
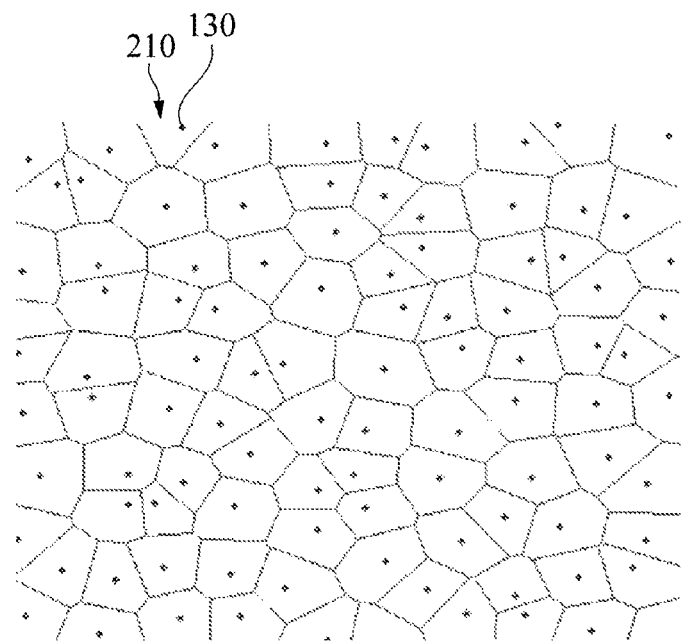
FIG. 4C is a schematic view of the metal mesh pattern when the ratio of the area of each of the seed regions to the area of each of the mesh base units is 64% according to another embodiment of this invention.
Figure 4D:
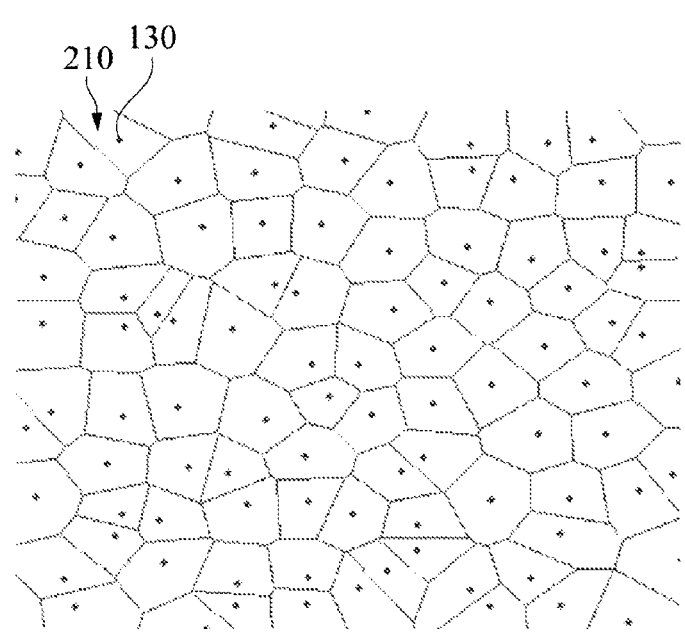
FIG. 4D is a schematic view of the metal mesh pattern when the ratio of the area of each of the seed regions to the area of each of the mesh base units is 90% according to another embodiment of this invention.

FIG. 4A is a schematic view of the metal mesh pattern 200 when the ratio of the area of each of the seed regions 120 to the area of each of mesh base units 110 is 0 according to another embodiment of this invention. FIG. 4B is a schematic view of the metal mesh pattern 200 when the ratio of the area of each of the seed regions 120 to the area of each of the mesh base units 110 is 25% according to another embodiment of this invention. FIG. 4C is a schematic view of the metal mesh pattern 200 when the ratio of the area of each of the seed regions 120 to the area of each of the mesh base units 110 is 64% according to another embodiment of this invention. FIG. 4D is a schematic view of the metal mesh pattern 200 when the ratio of the area of each of the seed regions 120 to the area of each of the mesh base units 110 is 90% according to another embodiment of this invention. As shown in FIGS. 4A to 4D, when the ratio of the area of each of the seed regions 120 to the area of each of mesh base units 110 is different, the overall characteristic of the metal mesh pattern 200 is different.

As shown in FIGS. 2A and 4A, when the ratio of the area of each of the seed regions 120 to the area of each of mesh base units 110 is 0, each of the seed regions 120 is one point disposed in the center of each of the mesh base units 110. Therefore, the shapes of the mesh units 210 of the metal mesh pattern 200 are rectangles.

As shown in FIGS. 4B and 4C, when the ratio of the area of each of the seed regions 120 to the area of each of mesh base units 110 is from 25% to 64%, compared with the shapes of the mesh units 210 of FIG. 4A, the shapes of the mesh units 210 appear more irregular and more random.

As shown in FIG. 4D, when the ratio of the area of each of the seed regions 120 to the area of each of mesh base units 110 is 90%, compared with the shapes of the mesh units 210 of FIGS. 4A and 4B, the shapes of the mesh units 210 appear more irregular and more random, and the areas of the mesh units 210 become more differentiated.

From the above comparison, the ratio of the area of each of the seed regions 120 to the area of each of mesh base units 110 can be from 25% to 65%. In this condition, the shapes of the mesh base units 210 are different, i.e., the shapes are random, and the areas of the mesh base units 210 are substantially the same. Therefore, moiré may not be generated by the superimposition of the metal mesh in the metal mesh pattern 200 and the pattern showed by the display panel, and the metal wires of the metal mesh are substantially evenly distributed, such that the metal mesh in the metal mesh pattern 200 is suitable for touch detection.

Figure 5A:
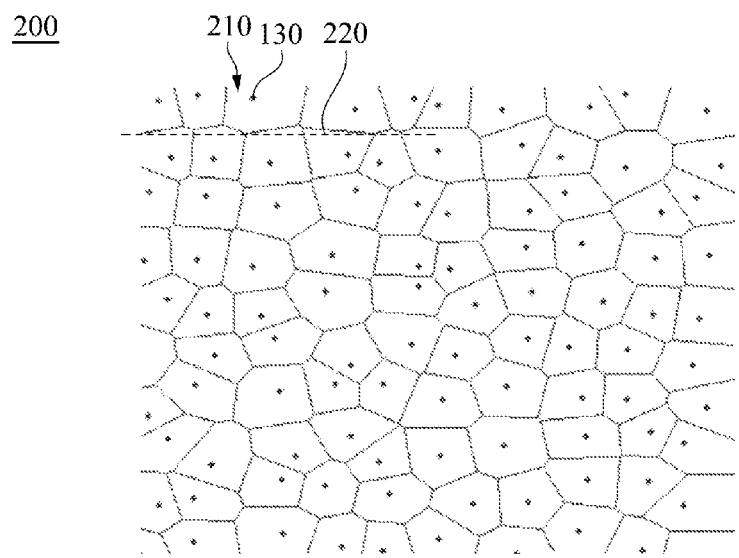
FIG. 5A is a schematic view of the metal mesh pattern with a line similar to the horizontal line according to another embodiment of this invention.
Figure 5B:
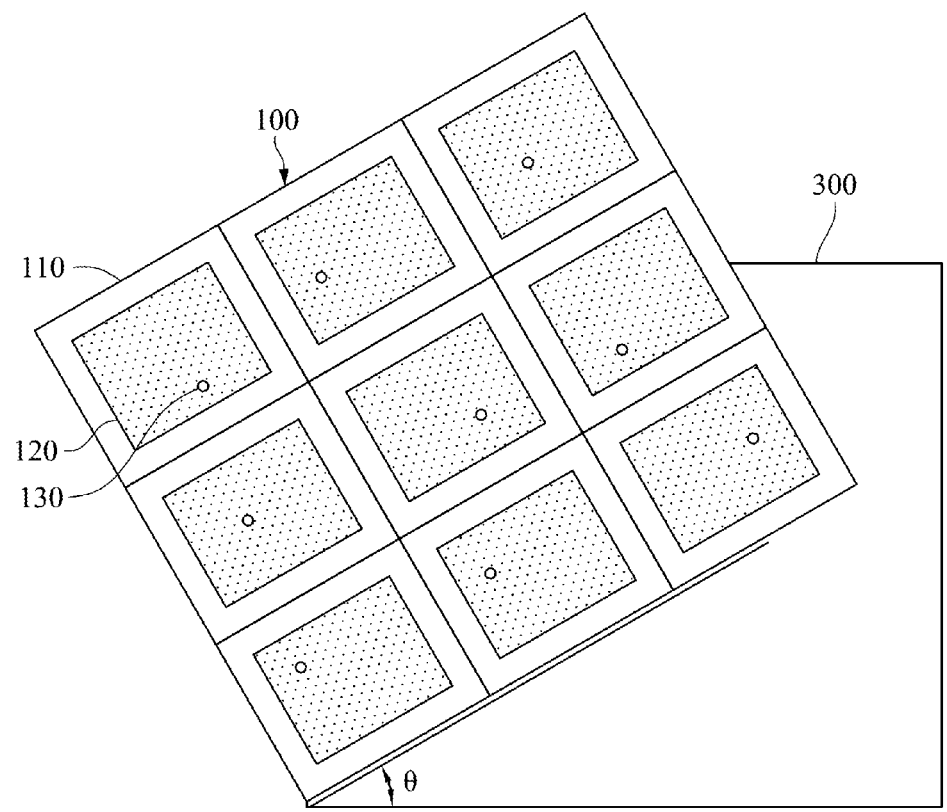
FIG. 5B is a schematic view of the mesh base, the seed regions, the seeds, and a display panel according to one embodiment of this invention.

FIG. 5A is a schematic view of the metal mesh pattern 200 with a line similar to the horizontal line 220 according to another embodiment of this invention. As shown in FIG. 5A, the metal mesh pattern 200 sometimes has a line similar to the horizontal line 220, and the line similar to the horizontal line 220 is easy to be superimposed with the pattern showed by the display panel to generate moiré. Therefore, as shown in FIG. 5B, which is a schematic view of the mesh base 100, the seed regions 120, the seeds 130, and a display panel 300 according to one embodiment of this invention, when the metal mesh pattern 200 is formed, make the mesh base 100 inclined relative to a corresponding display panel 300. Therefore, even the metal mesh pattern 200 has the line similar to the horizontal line 220, the line is inclined relative to the display panel 300, such that moiré is not easy to be generated by the superimposition of the line and the pattern showed by the display panel 300.

Specifically, an inclined angle between the mesh base 100 and the display panel 300 is substantially 30 degrees. Embodiments of this disclosure are not limited thereto. People having ordinary skill in the art can make proper modifications to the relation of the mesh base 100 and the display panel 300 depending on the actual application.

A ratio of a length of the pitch, which may be the width A or the length B, of each of the mesh base units 110 to a side length of a sub-pixel of the display panel 300 is from 1.05 to 1.2 or from 1.5 to 1.7. Therefore, the display panel 300 has a better aperture ratio/transmittance and thus has a better display performance.

Figure 6:
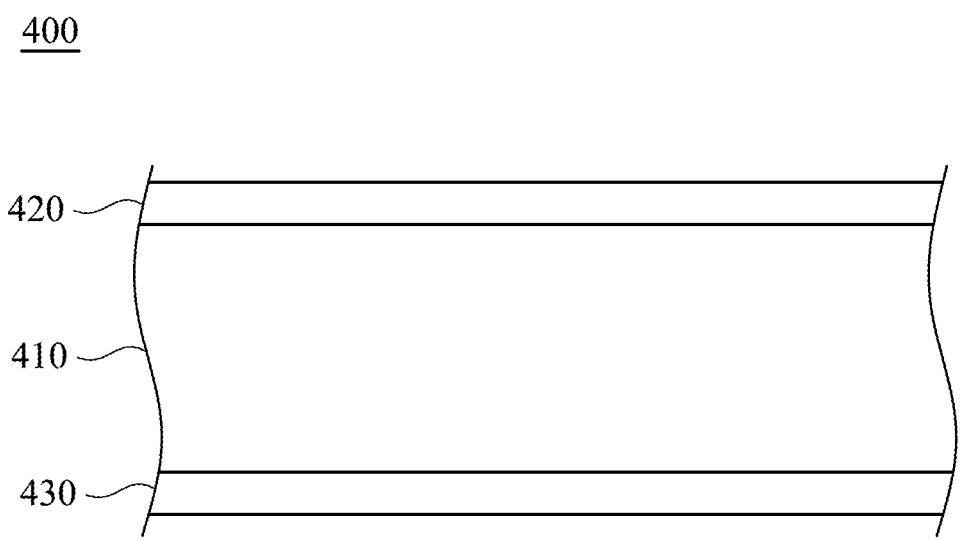
FIG. 6 is a cross-sectional view of a touch panel according to one embodiment of this invention.

FIG. 6 is a cross-sectional view of a touch panel according to one embodiment of this invention. As shown in FIG. 6, a touch panel 400 is provided. The touch panel 400 includes a substrate 410, a first metal mesh 420, and a second metal mesh 430. The first metal mesh 420 is disposed on one side of the substrate 410. The second metal mesh 430 is disposed on the other side of the substrate 410. The first metal mesh 420 and the second metal mesh 430 respectively has a first metal mesh pattern and a second metal mesh pattern formed by the aforementioned method.

Figure 7A:
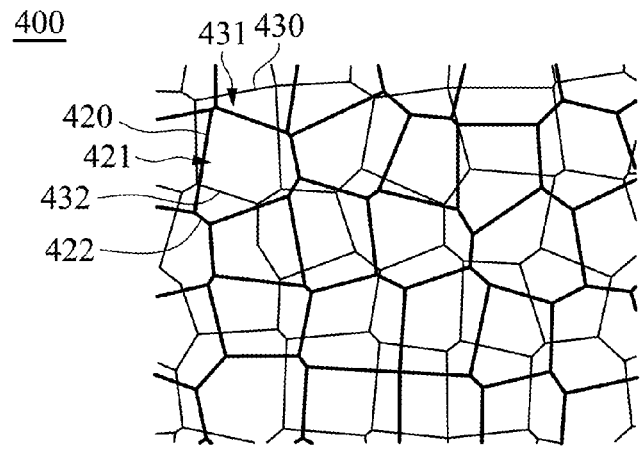
FIG. 7A is a top view of the touch panel when the ratio of the area of each of the seed regions to the area of each of the mesh base units is 25% according to another embodiment of this invention.
Figure 7B:
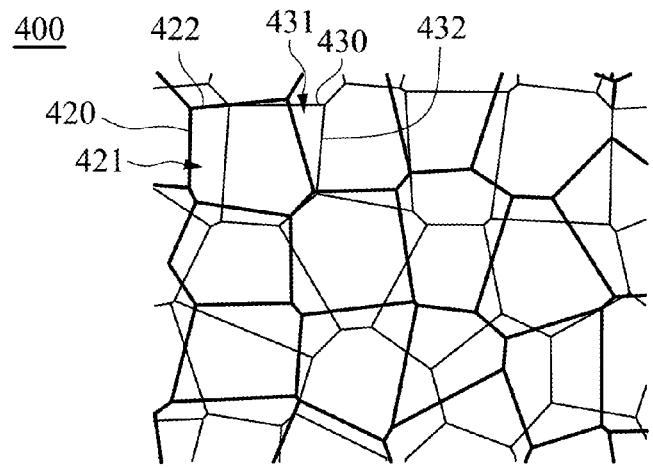
FIG. 7B is a schematic view of the touch panel when the ratio of the area of each of the seed regions to the area of each of the mesh base units is 49% according to another embodiment of this invention.
Figure 7C:
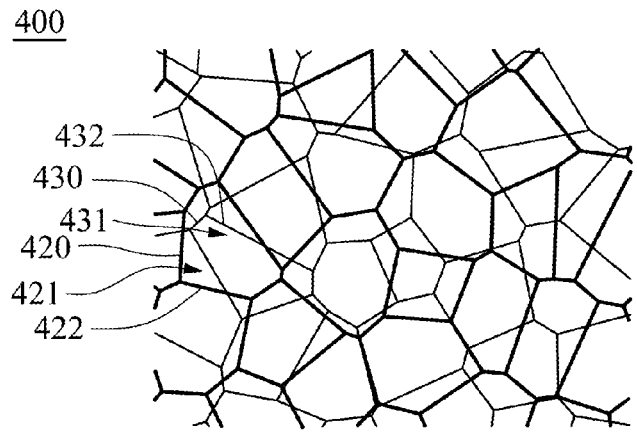
FIG. 7C is a schematic view of the touch panel when the ratio of the area of each of the seed regions to the area of each of the mesh base units is 81% according to another embodiment of this invention.

FIG. 7A is a top view of the touch panel 400 when the ratio of the area of each of the seed regions 120 to the area of each of the mesh base units 110 is 25% according to another embodiment of this invention. FIG. 7B is a schematic view of the touch panel 400 when the ratio of the area of each of the seed regions 120 to the area of each of the mesh base units 110 is 49% according to another embodiment of this invention. FIG. 7C is a schematic view of the touch panel 400 when the ratio of the area of each of the seed regions 120 to the area of each of the mesh base units 110 is 81% according to another embodiment of this invention. As shown in FIG. 7A to 7C, the first metal mesh 420 includes a plurality of first mesh units 421. The second metal mesh 430 includes a plurality of second mesh units 431. The shapes of the first mesh units 421 and the second mesh units 431 are substantially irregular hexagons. Orthographic projections of the first mesh units 421 onto the substrate 410 are staggered with orthographic projections of the second mesh units 431 onto the substrate 410.

Specifically, the spacings between the orthographic projections of the first mesh units 421 onto the substrate 410 and the orthographic projections of the second mesh units 431 onto the substrate 410 are similar. Compared with FIG. 7A, in FIG. 7C, the spacings between orthographic projections of metal wires 422 onto the substrate 410 and orthographic projections of metal wires 432 onto the substrate 410 are more differentiated, the orthographic projections of some of the metal wires 422 onto the substrate 410 almost overlap with the orthographic projections of some of the metal wires 432 onto the substrate 410. Additionally, the distribution pattern of metal wires 422 and 432 of FIG. 7B is between the one of FIG. 7A and the one of FIG. 7C.

If the spacings between the orthographic projections of metal wires 422 onto the substrate 410 and the orthographic projections of metal wires 432 onto the substrate 410, capacitances and electric fields distributed in the touch panel 400 are more uniform, such that the touch panel 400 is suitable for touch detection.

By the aforementioned method, the shapes of mesh units 210 of the metal mesh pattern 200 are different, i.e., the shapes are random. Therefore, moiré may not be generated by the superimposition of a metal mesh in the metal mesh pattern 200 and the pattern showed by the display panel, such that the display device has a better display performance.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "operation for" performing a specific function, is not to be interpreted as a "means" or "operation" clause as specified in 35 U.S.C. § 112, 6th paragraph. In particular, the use of "operation of" in the claims herein is not intended to invoke the provisions of 35 U.S.C. § 112, 6th paragraph.

What is claimed is:

1. A method for forming a metal mesh pattern on a corresponding display panel, the method comprising:
   defining a mesh base of the metal mesh pattern and the mesh base consisting of a plurality of mesh base units;
   determining at least one pitch of each mesh base unit of the mesh base, wherein a ratio of the pitch of each mesh base unit to a side length of a sub-pixel of the corresponding display panel ranges from 1.05 to 1.2 or 1.5 to 1.7;
   setting a seed region and an non-seed region within each mesh base unit;
   within each mesh base unit, generating a plurality of seeds by randomly selecting a point in the seed region and generating no seed in the non-seed region, wherein the plurality of seeds do not occupy the whole area of the seed region, a ratio of an area of the seed region to an area of each mesh base unit is a constant; and
   forming the metal mesh pattern, wherein the metal mesh pattern consisting of perpendicular bisectors of lines interconnecting between any immediately-adjacent two of the plurality of seeds.

2. The method of claim 1, wherein the mesh base units are rectangles.

3. The method of claim 2, wherein each of the mesh base units is aligned with its adjacent mesh base units.

4. The method of claim 2, wherein the mesh base units are staggered with the adjacent mesh base units.

5. The method of claim 2, wherein the mesh base is inclined relative to the corresponding display panel.

6. The method of claim 5, wherein an inclined angle between the mesh base and the corresponding display panel is substantially 30 degrees.

7. The method of claim 1, wherein the ratio of the area of the seed region to the area of each mesh base unit is from 25% to 65%.

8. The method of claim 1, wherein the seed region is concentric to the mesh base unit within which the seed region is located.

9. A touch panel, comprising:
   a substrate; and
   a first metal mesh disposed on one side of the substrate, wherein the first metal mesh has a first metal mesh pattern formed by the method of claim 1.

10. The touch panel of claim 9, wherein the first metal mesh comprises a plurality of first mesh units, and the shapes of the first mesh units are irregular hexagons.

11. The touch panel of claim 9, further comprising:
    a second metal mesh disposed on the other side of the substrate, wherein the second metal mesh has a second metal mesh pattern formed by the method of claim 1, the first metal mesh comprises a plurality of first mesh units, the second metal mesh comprises a plurality of second mesh units, and orthographic projections of the first mesh units onto the substrate are staggered with orthographic projections of the second mesh units onto the substrate.

* * * * *